United States Patent [19]

Schmitz

[11] Patent Number: 5,743,221
[45] Date of Patent: Apr. 28, 1998

[54] METHOD FOR A THROTTLE-FREE LOAD CONTROL OF AN INTERNAL COMBUSTION ENGINE BY MEANS OF VARIABLY CONTROLLABLE CYLINDER VALVES

[75] Inventor: Günter Schmitz, Aachen, Germany

[73] Assignee: FEV Motorentechnik GmbH & Co. KG, Aachen, Germany

[21] Appl. No.: 683,972

[22] Filed: Jul. 22, 1996

[30] Foreign Application Priority Data

Jul. 22, 1995 [DE] Germany ............. 195 26 848.2

[51] Int. Cl.[6] ................................. F01L 9/04; F01L 13/00
[52] U.S. Cl. ................................. 123/90.11; 123/90.15
[58] Field of Search ................. 123/90.11, 90.12, 123/90.13, 90.14, 90.15, 90.16, 90.17

[56] References Cited

U.S. PATENT DOCUMENTS 5,133,310  7/1992  Hitomi et al. ............. 123/90.16
5,606,960  3/1997  Takahashi et al. .......... 123/90.15

*Primary Examiner*—Weilun Lo
*Attorney, Agent, or Firm*—Spencer & Frank

[57] ABSTRACT

A method of operating an internal-combustion engine including a plurality of cylinders; cylinder valves for admitting gases into and removing gases from the cylinders; and actuators connected to the valves for reciprocating the valves between open and closed positions. The method includes the following steps: controlling the actuators of the plurality of cylinders with a first control process as a function of load requirements arising during engine run, as long as the load requirements remain at or above a minimum value; controlling the actuators of at least one first cylinder of the plurality of cylinders with a second control process when the load requirement falls below the minimum value; and simultaneously with controlling the actuators of the first cylinder with the second control process, controlling the actuators of at least one second cylinder of the plurality of cylinders with a third control process. The second and third control processes each may operate in a normal operational mode, a free-flying operational mode or zero-load operational mode or a combination thereof. The operational modes for the second and third control processes are so selected that the second and third control processes are different from one another.

5 Claims, 5 Drawing Sheets

METHOD FOR A THROTTLE-FREE LOAD CONTROL OF AN INTERNAL COMBUSTION ENGINE BY MEANS OF VARIABLY CONTROLLABLE CYLINDER VALVES

CROSS REFERENCE TO RELATED APPLICATION

This application claims the priority of German Application No. 195 26 848.2 filed Jul. 22, 1995, which is incorporated herein by reference.

BACKGROUND OF THE INVENTION

Multi-cylinder internal combustion engines operating with fuel injection and variably controllable cylinder valves may not need a throttle valve (butterfly valve) even in Otto cycle combustions. The load control is effected in such engines by varying the opening and closing moments of the cylinder valves. For this purpose, the intake and exhaust valves are reciprocated by appropriate mechanical, hydraulic or electromagnetically operated actuators to move the cylinder valves between their closed position and their open position. An appropriate control makes the opening stroke and/or its timing variable. In a normal operation the valve is alternatingly held in a position of rest defined by the "valve open" or "valve closed" state.

In case of a mechanical actuation, such a control is effected by rotating the control cam and/or changing the cam track contour. In case of electromagnetic actuators, each having a reciprocating armature which is coupled to the valve and in which a spring force determines a position of rest of the armature between two electromagnets, the control in a normal operation is effected by an alternating energization of the electromagnets so that the armature is alternatingly attracted by the upper or lower magnet and is held there to define the closed and, respectively, to the open position of the cylinder valve. For operating the cylinder valve, that is, for moving the cylinder valve from the closed position into the open position and conversely, the holding current through the solenoid of the respective holding magnet is switched off. This causes the holding force of the electromagnet to drop below the opposing spring force and the armature begins its motion, accelerated by spring force. After the armature traverses its position of rest, its motion is braked by the spring force of the oppositely located spring. Thus, to capture and retain the armature in the other position, current is passed through the electromagnet towards which the armature moves. Because of the natural frequency of the spring/mass system formed by the armature and the springs and because of the period of adherence (sticking) of the armature at the magnet, caused by the finite decay period of the magnetic field, the problem has been encountered that at high rpm's the minimum achievable opening periods are excessively long for an operation at low loads, that is, at small engine torques.

Several solutions have been proposed to solve the above-outlined problem. According to one solution, in addition to the valves which are freely controllable in accordance with load requirements, a throttle flap (butterfly valve) has been provided which is controlled according to the occurring operational conditions. Such a solution, however, leads to an increase in manufacturing costs and involves an additional structural component.

According to another solution, the fuel supply has been reduced, whereby either a lean operation with λ=1 has been realized or a lesser proportion of fresh gas mixture has been made available for the same cylinder charge by means of an additional supply of residual gases. Such a control, however, is feasible only within certain limits.

Still another solution resides in that the actuators of the cylinder valves are controlled in such a manner that the cylinder valves do not open fully. This mode of operation will be hereafter referred to as a "free-flying" operational mode. In electromagnetic actuators such a mode of operation is achieved by holding the armature by the electromagnet in the closed position of the cylinder valve, while for the opening of the valve first the holding current is switched off, as described earlier in connection with the normal operational mode. Departing from the normal operational mode, the armature is allowed to move back without being captured at the "valve open" side. In this manner the sticking period is circumvented at the "valve open" side. The free-flying operational mode, however, is involved with the problem that certain load ranges cannot be covered. This is caused by the time difference in the length of the sticking period of the electromagnet between the free-flying and normal operational modes when the armature is captured on the "valve open" side.

SUMMARY OF THE INVENTION

It is an object of the invention to provide an improved engine valve control method which is performed with controllable actuators and which covers even those load ranges which are excluded from the normal and free-flying operational modes.

This object and others to become apparent as the specification progresses, are accomplished by the invention, according to which, briefly stated, the method of operating an internal-combustion engine includes the following steps: controlling the actuators of the engine cylinders with a first control process as a function of load requirements arising during engine run, as long as the load requirements remain at or above a minimum value; controlling the actuators of at least one first cylinder of the plurality of cylinders with a second control process when the load requirement falls below the minimum value; and simultaneously with controlling the actuators of the first cylinder with the second control process, controlling the actuators of at least one second cylinder of the plurality of cylinders with a third control process. The second and third control processes each may operate in a normal operational mode, a free-flying operational mode or zero-load operational mode or a combination thereof. The operational modes for the second and third control processes are so selected that the second and third control processes are different from one another.

The inventive method as defined above avoids the "holes" (that is, the not-covered load ranges) during the normal and the free-flying operational modes by means of differently controlling the individual cylinders when given load requirements are not reached. When the minimum load requirements are not met, dependent upon the number of engine cylinders, the actuators of the cylinder valves of one or more cylinders can continue to be controlled in the normal operational mode or at least in the free-flying operational mode. The actuators of the cylinder valves of the remaining cylinders are controlled at least in part in the free-flying operational mode. There is given, however, the further possibility to control one or more of the remaining cylinders in the "zero operational mode" which means that fuel injection is discontinued and the associated cylinder valves are held, during the entire engine cycle of the regulating phase, either in the closed position or in the open position so that only a part of the cylinders is actually functioning.

According to a preferred embodiment of the method of the invention, in the range of small load requirements the cylinders are controlled alternatingly with the different load control processes. Such a method is advantageous in that the cylinders controlled in the normal operational mode continuously alternate so that the engine maintains an overall uniform temperature condition.

According to another preferred embodiment of the invention, in the range of small load requirements, the cycle grid of the work strokes is altered at least at one cylinder. The actuators of the individual cylinder valves are freely controllable. Therefore, as dictated by load requirements, it is also possible to assign a two-stroke cycle for a certain period or to disable the cylinder for two strokes, that is, for one half of a four-stroke cycle (zero load) with the aid of an electronic control device by means of which the load requirement is given and which controls the fuel injection. In this manner a six-stroke method is obtained. Instead of disabling the cylinders, a six-stroke process can also be achieved by means of a positive control of the actuators for the respective cylinder or cylinders.

DESCRIPTION OF THE PREFERRED EMBODIMENTS

Figure 1:
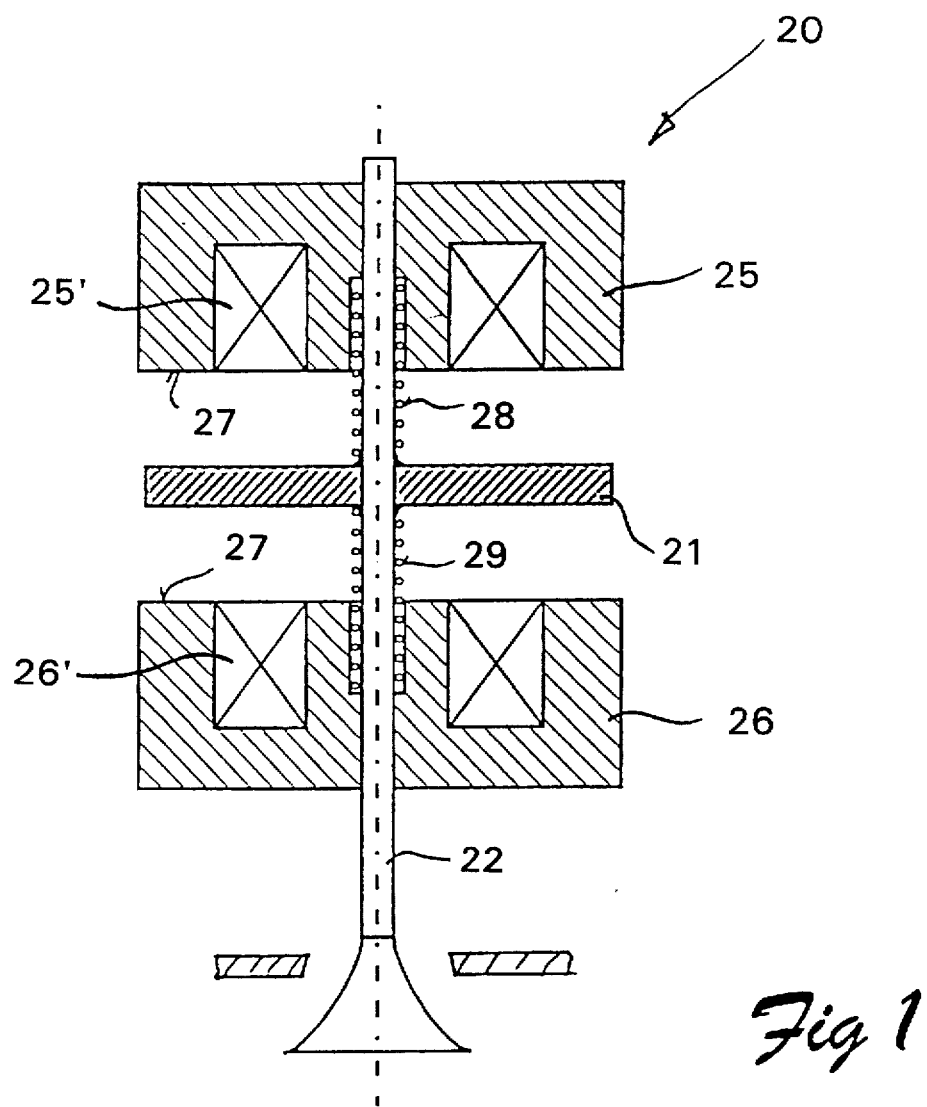
FIG. 1 is a schematic sectional side elevational view of an electromagnetic actuator for a cylinder valve for practicing the method according to the invention.

FIG. 1 schematically illustrates an electromagnetic actuator generally designated at 20, having an armature 21 which is attached to the stem of a cylinder valve 22 as well as a closing magnet 25 and an opening magnet 26 acting on the armature 21. The closing magnet 25 has a solenoid 25' and the opening magnet 26 has a solenoid 26'. Both magnets 25 and 26 have corresponding pole faces 27. In the deenergized state of the magnets 25 and 26 the armature 21 is maintained in a position of rest between the two magnets 25 and 26 by oppositely working return springs 28 and 29.

In the "valve closed" position the armature 21 engages the pole face 27 of the closing magnet 25.

For operating the cylinder valve 22, that is, for initiating a motion from the closed position into the open position, the flow of the holding current through the solenoid 25' of the closing magnet 25 is discontinued. As a result, the holding force of the closing magnet 25 falls below the spring force of the return spring 28 and thus the armature begins its motion, accelerated by the return spring 28. After the armature 21 has traversed the position of rest, its motion is braked by the spring force of the return spring 29 associated with the opening magnet 26. To catch the armature 21 in the open position and to retain it there, the opening magnet 26 is supplied with current. For closing the cylinder valve 22, the above-described switching and motion sequence is effected in the reverse sense.

Figure 2:
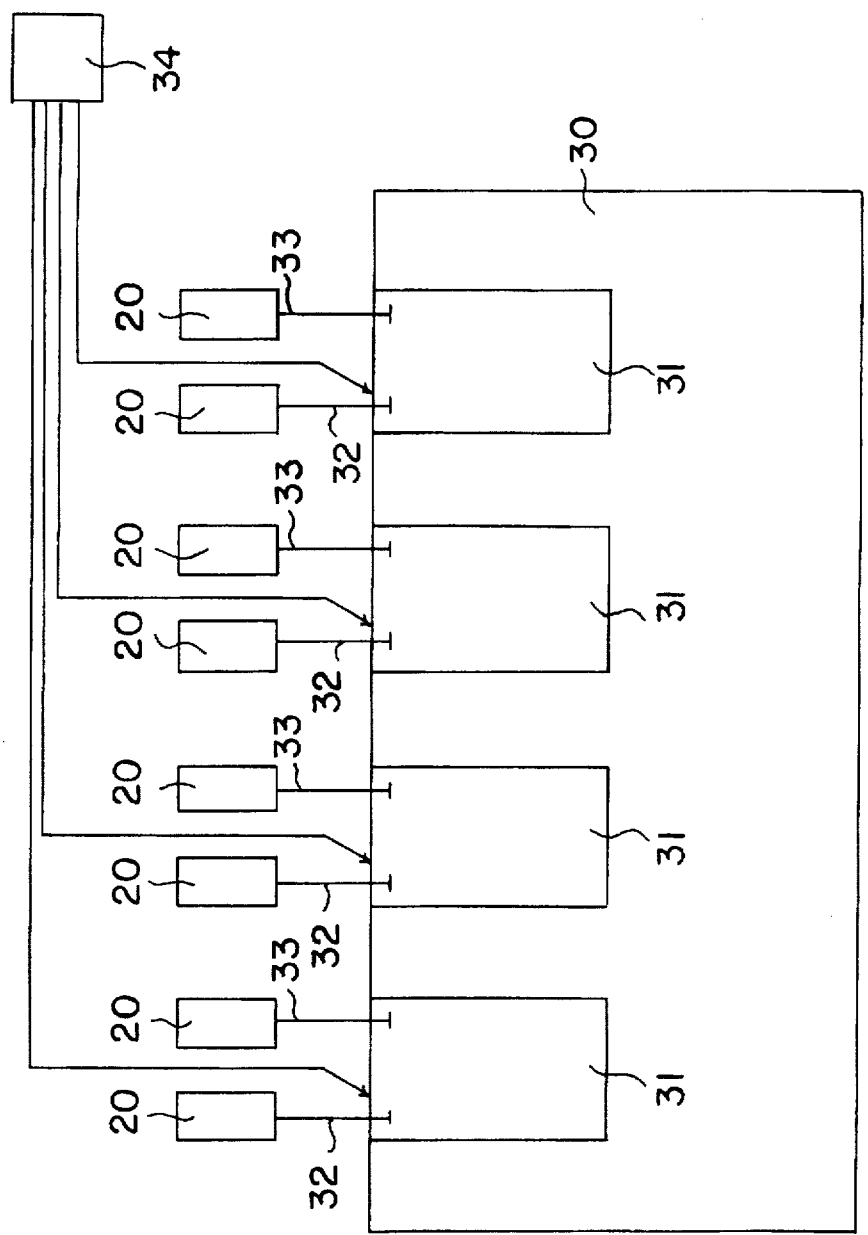
FIG. 2 is a schematic view of a fuel-injected four-cylinder engine, whose cylinder valves are operated by electromagnetic actuators controllable with a method according to the invention.

Turning to FIG. 2, there is schematically shown an internal combustion engine 30 which may be controlled according to the method of the invention. The engine 30 has four cylinders 31, each being provided with an intake valve 32 and an exhaust valve 33. All valves 32, 33 are individually operated by a respective electromagnetic actuator 20 described in connection with FIG. 1. Intake gases are supplied to the cylinders 31 by a fuel injection system 34.

Figures 3A, 3B, 3C:
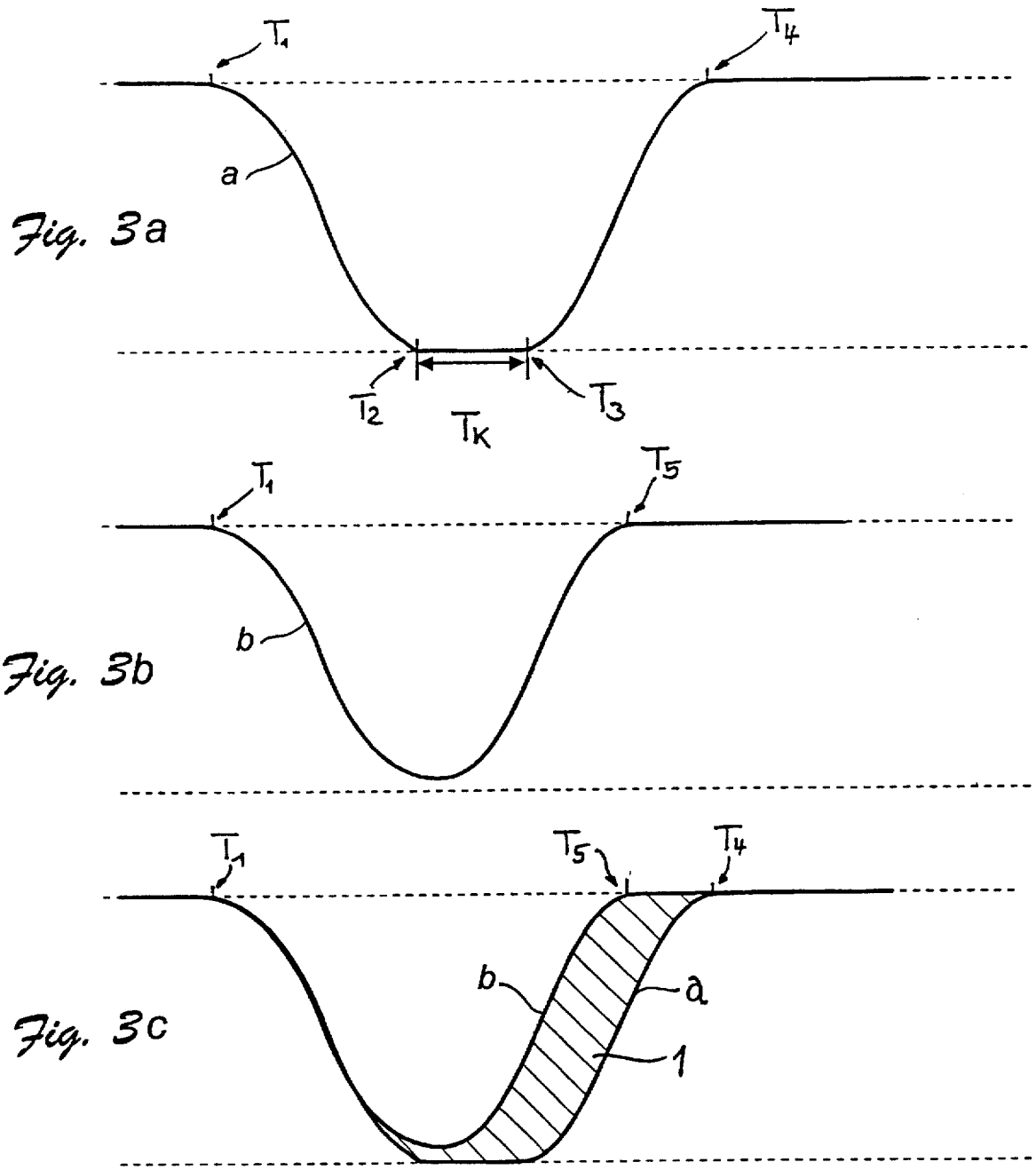
FIG. 3a is a diagram illustrating valve displacement as a function of time for the normal operational mode.
FIG. 3b is a diagram illustrating valve displacement as a function of time for the free-flying operational mode.
FIG. 3c is a diagram illustrating valve displacement as a function of time for a superposed normal and free-flying operational mode.

FIGS. 3a, 3b and 3c illustrate displacement curves, as a function of time, of an electromagnetically operated cylinder valve between an open and a closed valve position. Curve a in FIG. 3a illustrates the valve displacement from the closed position into the open position and back into the closed position with a control process in the normal operational mode. After switching off the holding current and after the lapse of the sticking period, the armature moves away from the closing magnet of the electromagnetic actuator at moment $T_1$ and moves towards the opening magnet of the actuator which captures the armature at moment $T_2$ and holds it thereafter.

As also illustrated in FIG. 3a, if the holding current is switched off immediately after capturing the armature at the opening magnet, the armature would be maintained for a minimum sticking period $T_k$ until the magnetic field decays so that the armature would move away from the opening magnet only at moment $T_3$ and would thereafter be caught by the closing magnet at moment $T_4$ and held in that position. The minimum opening period of the valve during the normal operational mode is thus determined by the minimum sticking period $T_k$ which, because of constructional and physical properties, may not be shortened.

The curve b of FIG. 3b shows the valve displacement during the "free-flying" operational mode. Here too, the armature moves away from the holding closing magnet at moment $T_1$ after switching off the current and after lapse of the sticking period so that the armature may move into the open position under spring force. Such a motion may be further enhanced by the build-up of a magnetic field in the opening magnet. The current flow through the opening magnet, however, is limited such that the armature does not come into engagement with the opposite (opening) magnet and is thus not held thereby but freely turns around and moves again towards the closing magnet where it comes to rest at moment $T_5$. Similar motion courses are obtained, for example, for hydraulic actuators.

If the motion curves a and b are superposed as illustrated in FIG. 3c, a shaded area 1 is obtained which cannot be covered by the two control processes.

Figure 4:
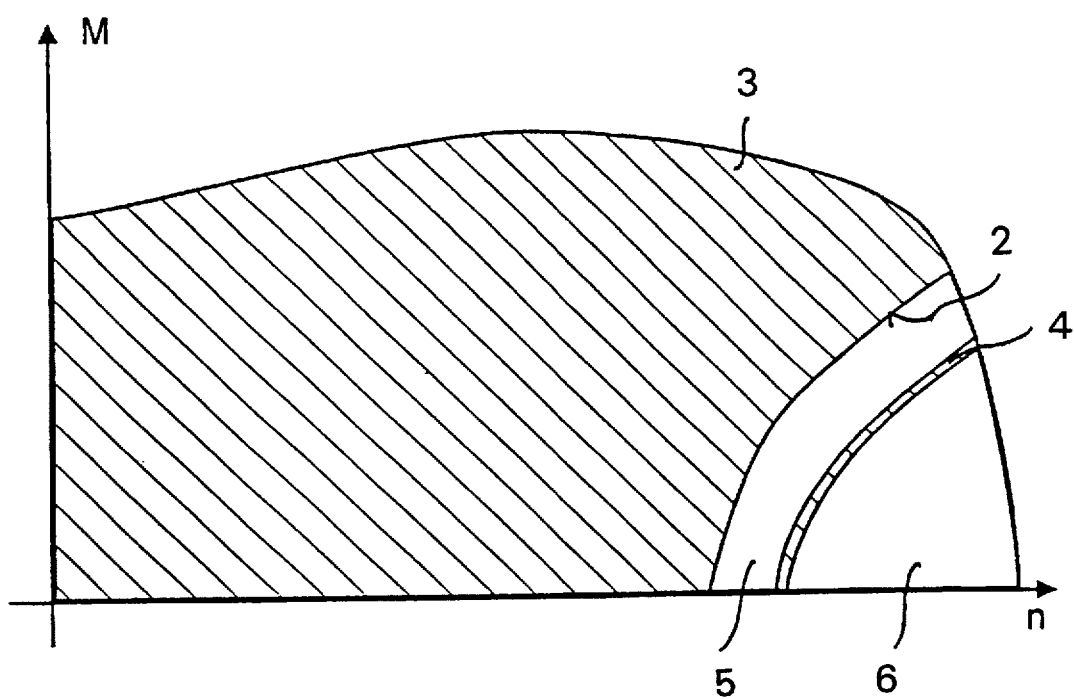
FIG. 4 is a diagram illustrating the non-coverable operational ranges in the form of a torque field as a function of rpm.

FIG. 4 is a diagram of the engine torque M as a function of the engine rpm n. Thus, FIG. 4 schematically shows a torque field which illustrates the effects of the limitations discussed in connection with FIG. 3c. By controlling the actuators in the normal operational mode according to FIG. 3a, at higher rpm's the range of small engine torques cannot be covered because a certain minimum opening period (armature sticking period) $T_k$ cannot be reduced. Therefore, the boundary 2 is obtained for the covered range 3 that may be realized with the normal operational mode.

The range 4 which may be covered with the free-flying operational mode has a certain width which may be modified by varying the position of the free flight relative to the angular position of the crankshaft as well as by supplying the opening magnet with current. Between the coverable ranges 3 and 4 and underneath the range 4, however, respective non-coverable ranges 5 and 6 are situated.

Figure 5:
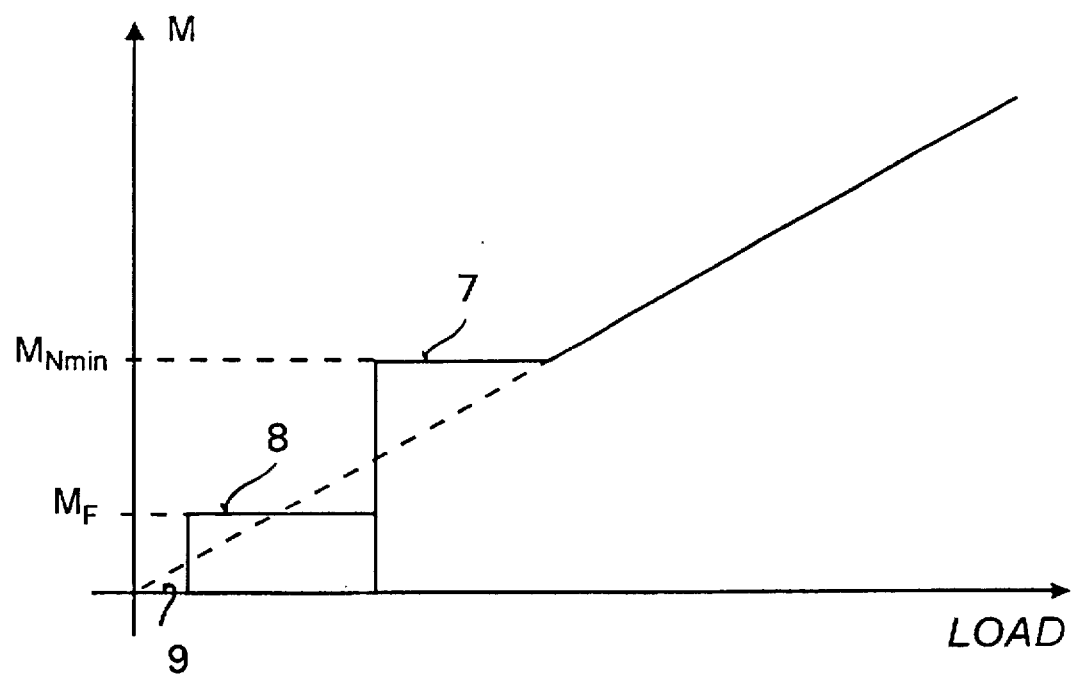
FIG. 5 is a diagram illustrating the course of the engine torque in the normal operational mode as a function of the desired load.

The diagram of FIG. 5 illustrates the course of the engine torque as a function of load requirements (desired load) for a given rpm. In the range of high loads the engine torque follows exactly the load requirement. When the load requirement falls below a certain limit, according to conventional control methods there is only a choice between a normal operational mode with a minimum sticking period $T_k$ and the associated minimum torque $M_N$ (range 7), a free-flying operational mode with the associated torque $M_F$ (range 8) or a zero load operational mode with zero torque (range 9) which is obtained by holding the respective cylinder valve in the closed or open position. This type of control divides the torque into stepped torque ranges which is a nuisance for the driver of the vehicle.

Figure 6:
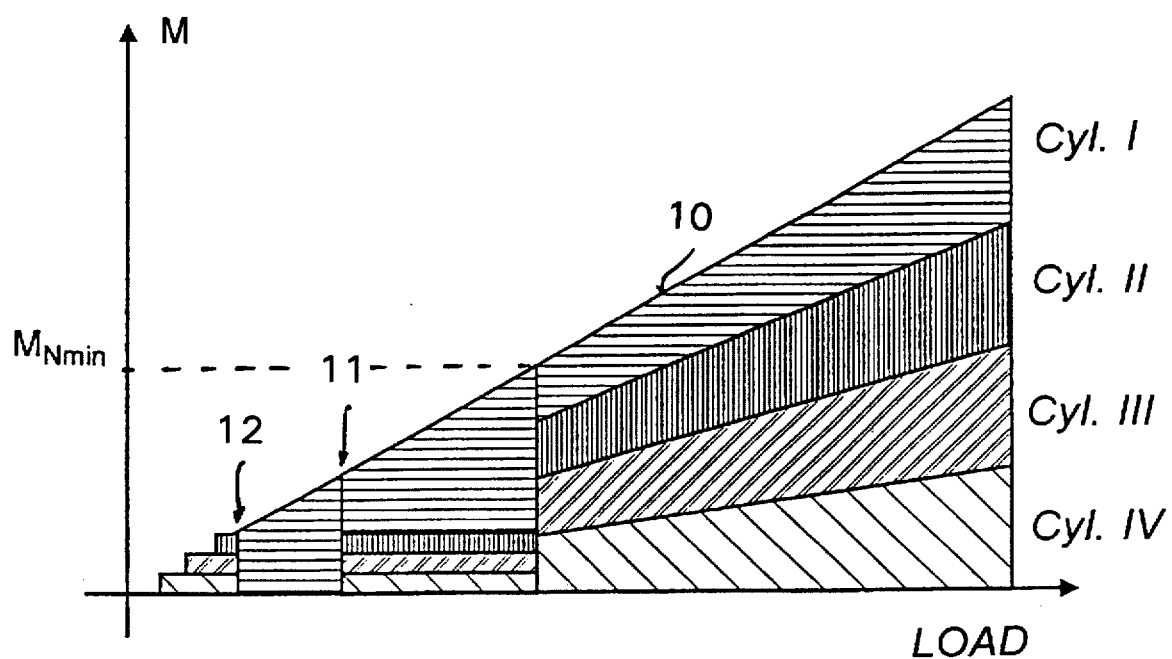
FIG. 6 is a diagram illustrating the course of the engine torque in the control process according to the invention.

FIG. 6 illustrates a diagram of a torque/load relationship obtainable by a control according to the invention to remedy the problem described in connection with FIG. 5. Thus, the method resulting in the torque curve 10 of FIG. 6 is effected by the different control of the individual cylinders. As an example for the description of the method according to the invention a four-cylinder engine is selected. Underneath the curve 10 illustrating the entire engine torque, all torques for the individual cylinders I–IV are shown. Viewing the curve 10 towards decreasing desired loads, upon reaching the minimum possible load $M_{Nmin}$ in the normal operational mode, one cylinder, for example, cylinder I is continued to be controlled in the normal operational mode while the other three cylinders II, III and IV are controlled in the free-flying operational mode. In this manner for the cylinder I controlled in the normal operational mode a higher load requirement is obtained which may be realized even upon further reduction of the desired load.

As soon as the magnitude of the load requirement drops to the value $$\frac{3 \cdot M_{Fmin} + M_{Nmin}}{4}$$

(point 11 on the torque curve 10), one part of the cylinders must be shut off entirely. Thus, in the example of FIG. 4, cylinders II, III and IV are entirely shut off and the remaining cylinder I continues to be controlled in the normal operational mode. This operational control proceeds up to a reduction of the load requirement to approximately $\frac{1}{4}M_{Nmin}$ (point 12 on the torque curve 10).

At lower load requirements from point 12 on curve 10 again a stepped torque region appears which is caused by the transition of the control from the normal operational mode to a free-flying operational mode and by the transition from a free-flying operational mode to the zero load operational mode of the remaining cylinders. In the free-flying operational mode or the zero load operational mode very small steps may be achieved by virtue of a different control of the individual cylinders.

The showing of possible additional variations by changing the timing of the free-flying operational mode has been omitted from FIG. 6 for the sake of clarity. By means of such additional variations, even the last remaining steps may be at least reduced or eliminated altogether.

It is further feasible to select other load combinations at the individual cylinders. Thus, for example, it may be expedient to select in each instance that operational mode from the available combinations of the normal, the free-flying or the zero load operational modes which yields an optimal operation as concerns fuel consumption and/or environmental protection or other desired aspects.

Instead of holding the valve in the open or closed position, the zero load operational mode may be achieved differently, for example, by switching off the fuel injection. It is further expedient to alternate the load control method for the individual cylinders to ensure the advantages of a quiet engine run and a uniform heat distribution. Instead of alternating the control of the individual cylinders from cycle to cycle, it is a further possibility to alternate the mode of operation irregularly, for example, by means of a pseudo-random generator (noise generator) which may be included in the engine control system.

The control method is not limited to a cycle grid of a purely four-stroke process in case the actuators of the cylinder valves are freely controllable by the electronic engine control. In such a case it is feasible to insert in certain ranges a two-stroke cycle or to disable one or more cylinders for two strokes, that is, for one half of a four-stroke cycle to thus obtain an altogether six-stroke process. Instead of such a disabling, however, a six-stroke process may also be achieved by a positive control of the actuators of the cylinder valves in conjunction with a corresponding control of the fuel injection device.

It will be understood that the above description of the present invention is susceptible to various modifications, changes and adaptations, and the same are intended to be comprehended within the meaning and range of equivalents of the appended claims.

What is claimed is:

1. A method of operating an internal-combustion engine including a plurality of cylinders; cylinder valves for admitting gases into and removing gases from the cylinders; and actuators connected to the valves for reciprocating the valves between open and closed positions; comprising the following steps:

(a) controlling the actuators of the valves of said plurality of cylinders with a first control process as a function of load requirements arising during engine run, as long as the load requirements remain at or above a minimum value;

(b) controlling the actuators of the valves of at least one first cylinder of said plurality of cylinders with a second control process when the load requirement falls below said minimum value; and (c) simultaneously with step (b), controlling the actuators of the valves of at least one second cylinder of said plurality of cylinders with a third control process different from said first control process; said second control process being different from said third control process; and said second and third control processes each being selected from at least one of a normal operational mode, a free-flying operational mode and a zero-load operational mode.

2. The method as defined in claim 1, wherein said second control process is the same as said first control process.

3. The method as defined in claim 1, wherein said first control process operates in said normal operational mode, said second control process operates in said free-flying operational mode and said third control process is selected from at least one of said free-flying operational mode and said zero-load operational mode.

4. The method as defined in claim 1, further comprising the step of changing a cycle grid of work strokes of at least one of said cylinders in a load requirement range below said minimum value.

5. A method of operating an internal-combustion engine including a plurality of cylinders; cylinder valves for admitting gases into and removing gases from the cylinders; and actuators connected to the valves for reciprocating the valves between open and closed positions; comprising the following steps:

(a) controlling the actuators of the valves of said plurality of cylinders with a first control process as a function of load requirements arising during engine run, as long as the load requirements remain at or above a minimum value;

(b) alternatingly controlling the actuators of the valves of at least one first cylinder of said plurality of cylinders with a second and a third control process when the load requirement falls below said minimum value; and (c) simultaneously with step (b), alternatingly controlling the actuators of the valves of at least one second cylinder of said plurality of cylinders with said third and second control processes such that said second and third control processes are switched back-and-forth between said first and second cylinders; said second control process being different from said third control process; and said second and third control processes each being selected from at least one of a normal operational mode, a free-flying operational mode and a zero-load operational mode.

* * * * *